(12) United States Patent  
Eguchi

(10) Patent No.: US 10,882,503 B2  
(45) Date of Patent: Jan. 5, 2021

(54) ELECTROMECHANICAL BRAKE SYSTEM

(71) Applicant: NTN CORPORATION, Osaka (JP)

(72) Inventor: Masaaki Eguchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 187 days.

(21) Appl. No.: 15/748,897

(22) PCT Filed: Jul. 27, 2016

(86) PCT No.: PCT/JP2016/071979  
§ 371 (c)(1),  
(2) Date: Jan. 30, 2018

(87) PCT Pub. No.: WO2017/022586  
PCT Pub. Date: Feb. 9, 2017

(65) Prior Publication Data  
US 2018/0273010 A1    Sep. 27, 2018

(30) Foreign Application Priority Data  
Aug. 4, 2015    (JP) .................................. 2015-154264

(51) Int. Cl.  
*F16D 65/18* (2006.01)  
*B60T 13/74* (2006.01)  
(Continued)

(52) U.S. Cl.  
CPC ............ *B60T 13/745* (2013.01); *B60T 13/74* (2013.01); *B60T 13/741* (2013.01);  
(Continued)

(58) Field of Classification Search  
CPC ............ F16H 25/2252; F16D 2121/24; F16D 2125/50; F16D 2125/40; F16D 65/18  
See application file for complete search history.

(56) References Cited

U.S. PATENT DOCUMENTS 4,194,596 A * 3/1980 Garrett .................. F16D 55/224  
188/366  
4,526,053 A * 7/1985 Carson ................ F16H 25/2252  
74/424.75

(Continued)

FOREIGN PATENT DOCUMENTS

EP    1 085 240    3/2001  
EP    3 009 705    4/2016

(Continued)

OTHER PUBLICATIONS

Extended European Search Report dated Jul. 20, 2018 in European Application No. 16832865.6.

(Continued)

*Primary Examiner* — Bradley T King  
*Assistant Examiner* — Stephen M Bowes  
(74) *Attorney, Agent, or Firm* — Wenderoth, Lind & Ponack, L.L.P.

(57) ABSTRACT

An electromechanical brake system includes a linear motion mechanism configured to convert the rotation transmitted from the electric motor to a linear motion, thereby pressing a friction pad against a brake disk; a linear motion mechanism housing in which the linear motion mechanism is received as a single assembly with the components of the linear motion mechanism assembled together; and a caliper body shaped to extend across the outer periphery of the brake disk. The caliper body includes a claw portion axially supporting a friction pad; a housing-fixing plate which is arranged on the side of the linear motion mechanism housing opposite from the brake disk; and an outer shell portion through which the claw portion and the housing-fixing plate are coupled together.

20 Claims, 8 Drawing Sheets

(51) Int. Cl.
*F16D 65/02* (2006.01)
*F16D 65/00* (2006.01)
*F16D 55/226* (2006.01)
*F16D 121/26* (2012.01)
*F16H 25/20* (2006.01)

(52) U.S. Cl.
CPC ....... *F16D 55/226* (2013.01); *F16D 55/2262* (2013.01); *F16D 65/00* (2013.01); *F16D 65/02* (2013.01); *F16D 65/028* (2013.01); *F16D 65/18* (2013.01); *F16D 65/183* (2013.01); *F16D 65/186* (2013.01); *F16D 2121/26* (2013.01); *F16H 2025/2087* (2013.01)

(56) References Cited

U.S. PATENT DOCUMENTS

| | | | | |
|---|---|---|---|---|
| 6,315,086 | B1* | 11/2001 | Schmitt | B60T 13/741 188/158 |
| 6,367,592 | B1* | 4/2002 | Kapaan | F16D 65/18 188/158 |
| 6,412,608 | B1* | 7/2002 | Mohr | F16D 65/14 188/156 |
| 6,554,109 | B1* | 4/2003 | Olschewski | F15B 7/08 188/162 |
| 6,666,308 | B1* | 12/2003 | De Vries | F16D 65/18 188/156 |
| 6,767,305 | B2* | 7/2004 | Backes | F16D 65/18 188/161 |
| 8,616,346 | B2* | 12/2013 | No | F16D 65/18 188/156 |
| 2003/0050147 | A1 | 3/2003 | Backes et al. | |
| 2008/0271553 | A1 | 11/2008 | Wang et al. | |
| 2009/0095579 | A1 | 4/2009 | Yamasaki | |
| 2012/0181123 | A1* | 7/2012 | Ruiz | F16J 1/00 188/72.4 |
| 2013/0292215 | A1 | 11/2013 | Eguchi et al. | |
| 2015/0001010 | A1 | 1/2015 | Liao | |

FOREIGN PATENT DOCUMENTS

| | | | |
|---|---|---|---|
| EP | 3 333 441 | 6/2018 | |
| JP | 2002161933 A * | 6/2002 | |
| JP | 2007-37305 | 2/2007 | |
| JP | 2008-502850 | 1/2008 | |
| JP | 2008-79419 | 4/2008 | |
| JP | 2009-174585 | 8/2009 | |
| JP | 2011-89646 | 5/2011 | |
| JP | 2012-149747 | 8/2012 | |
| KR | 20100039072 | 4/2010 | |
| KR | 20100039493 | 4/2010 | |
| KR | 20120025140 | 3/2012 | |
| WO | WO-03027528 A1 * | 4/2003 | F16D 65/18 |

OTHER PUBLICATIONS

International Search Report dated Sep. 6, 2016 in International (PCT) Application No. PCT/JP2016/071979.

Translation of International Preliminary Report on Patentability dated Feb. 6, 2018 in International (PCT) Application No. PCT/JP2016/071979.

* cited by examiner

ELECTROMECHANICAL BRAKE SYSTEM

TECHNICAL FIELD

The present invention relates to an electromechanical brake system including a caliper body, and a linear motion mechanism arranged inside of the caliper body, and configured to convert the rotation transmitted from an electric motor to a linear motion.

BACKGROUND ART

As brake systems for a vehicle, hydraulic brake systems configured to be driven by oil pressure have been widely used. However, hydraulic brake systems use brake oil, thereby increasing a burden on the environment. Also, it is difficult to further increase the functionality of hydraulic brake systems, i.e., add, to hydraulic brake systems, functions such as a ABS, a stability control system, or a brake assisting system. In order to further increase the functionality of brake systems, and reduce a burden on the environment, electromechanical brake systems are gathering attention.

Electromechanical brake systems include a brake disk configured to rotate together with the vehicle wheel; a pair of friction pads axially opposed to each other through the brake disk; an electric motor; and a linear motion mechanism configured to convert the rotation transmitted from the electric motor to a linear motion, and press one of the friction pads against the brake disk, thereby generating a braking force.

Such an electromechanical brake system is disclosed in the below-identified Patent document 1. The electromechanical brake system illustrated in FIG. 5 of Patent document 1 includes a caliper body shaped to extend across the outer periphery of the brake disk. A receiving hole for receiving the linear motion mechanism of the brake system is formed in and opens to the surface of the caliper body opposed to the brake disk. The receiving hole includes a diameter reducing step formed on its inner periphery such that due to the diameter reducing hole, the diameter of the receiving hole is large on its side closer to the brake disk, and is small on its side remoter from the brake disk. The linear motion mechanism is inserted in the receiving hole from the side of the brake system closer to the brake disk. The diameter reducing step on the inner periphery of the receiving hole receives the axial reaction force applied to the linear motion mechanism when the linear motion mechanism presses the one of the friction pads to the brake disk.

However, it is difficult to form a receiving hole (hole in which the linear motion mechanism is received) in the caliper body of the electromechanical brake system of Patent document 1, because it is necessary to form, from the side of the brake system closer to the brake disk, a receiving hole in the caliper body so as to form a diameter reducing step on the inner periphery of the receiving hole. Also, it is difficult to form a receiving hole in an accurate manner from the side of the brake system closer to the brake disk, because the claw portion of the caliper body (portion of the caliper body opposite from the portion thereof on which the linear motion mechanism is located) is arranged on the center axis of the receiving hole.

Also, it is difficult to insert the linear motion mechanism into the receiving hole of the caliper body in the electromechanical brake system of Patent document 1. Namely, since this electromechanical brake system is configured such that the linear motion mechanism is supported by the diameter reducing step, integral with the inner periphery of the receiving hole, the linear motion mechanism needs to be inserted into the receiving hole from the side of the brake system closer to the brake disk. However, since the claw portion of the caliper body is arranged on the center axis of the receiving hole, specifically if the distance from the entrance of the receiving hole to the claw portion is short, the linear motion mechanism tends to interfere with the claw portion when inserted into the receiving hole from the above side, thus making it difficult to insert the linear motion mechanism into the receiving hole. In order to prevent the linear motion mechanism from interfering with the claw portion, it is possible to form, in the claw portion, a cutout through which the linear motion mechanism passes. However, even if such a cutout is formed in the claw portion, it is still difficult to insert the linear motion mechanism into the receiving hole.

In order to overcome the above problem, the inventor of the present application has proposed, in the below-identified Patent document 2, an electromechanical brake system including, as illustrated in FIG. 5 of Patent document 2, a caliper body having a receiving hole for receiving the linear motion mechanism of the brake system. This receiving hole is a through hole including an opening on the side of the brake system closer to the brake disk, and an opening on the side of the brake system opposite/remoter from the brake disk. The linear motion mechanism can be easily inserted into the receiving hole from the opening on the side of the brake system opposite/remoter from the brake disk.

The electromechanical brake system of Patent document 2 is configured such that after the linear motion mechanism is inserted in the receiving hole, a stopper ring is fitted in a ring groove formed in the inner periphery of the receiving hole so as to restrict one of the two opposite axial movements of the linear motion mechanism, and to receive the axial reaction force applied to the linear motion mechanism when the linear motion mechanism presses one of the friction pads against the brake disk. The stopper ring is constituted by combining a plurality of divided circular arc-shaped members to each other. Therefore, by mounting these divided members to the ring groove one by one, it is possible to easily mount the stopper ring to the ring groove. Since the electromechanical brake system of Patent document 2 is configured such that as described above, the stopper ring, provided separately from the caliper body, receives the axial reaction force applied to the linear motion mechanism, it is possible to form a receiving hole easily and accurately from the side of the brake system opposite/remoter from the brake disk.

The below-identified Patent document 3 discloses an electromechanical brake system similar to the electromechanical brake system of Patent document 2, i.e., configured such that the linear motion mechanism can be inserted into the receiving hole from the side of the brake system opposite/remoter from the brake disk, and further such that after the linear motion mechanism is inserted in the receiving hole, a stopper ring is fitted in a ring groove formed in the inner periphery of the receiving hole so as to receive the axial reaction force applied to the linear motion mechanism when the linear motion mechanism presses one of the friction pads against the brake disk.

PRIOR ART DOCUMENTS

Patent Documents

Patent document 1: Japanese Unexamined Patent Application Publication No. 2007-037305

Patent document 2: Japanese Unexamined Patent Application Publication No. 2008-079419

Patent document 3: Japanese Unexamined Patent Application Publication No. 2012-149747

SUMMARY OF THE INVENTION

Problems to be Solved by the Invention

However, in the electromechanical brake systems of Patent documents 1 and 2, maintenance cannot be performed easily, and thus a measure needs to be taken to enable easy maintenance. Namely, when the linear motion mechanism of each electromechanical brake system needs to be detached from the receiving hole of the caliper body for maintenance, it is necessary to beforehand detach all of the components around the receiving hole (the electric motor, the stopper ring, etc. illustrated in FIG. 5 of Patent document 2) (the gears for speed reduction, the stopper ring, the cover, etc. illustrated in FIG. 1 of Patent document 3). Also, since the linear motion mechanism of each electromechanical brake system is directly inserted in the receiving hole of the caliper body, the components of the linear motion mechanism might be disassembled when the linear motion mechanism is detached.

It is an object of the present invention to provide an electromechanical brake system enabling easy maintenance.

Means for Solving the Problems

In order to achieve the above object, the present invention provides an electromechanical brake system comprising: an electric motor; two friction pads axially opposed to each other through a brake disk; a linear motion mechanism configured to convert rotation transmitted from the electric motor to a linear motion, thereby pressing one of the two friction pads against the brake disk; a linear motion mechanism housing in which the linear motion mechanism is received as a single assembly with components of the linear motion mechanism assembled together; and a caliper body shaped to extend across an outer periphery of the brake disk; wherein the caliper body comprises: a claw portion axially supporting the other of the two friction pads; a housing-fixing plate which is disposed on one of two sides of the linear motion mechanism housing that is opposite from the brake disk, and to which the linear motion mechanism housing is detachably fixed; and an outer shell portion which is located radially outwardly of the brake disk, and through which the claw portion and the housing-fixing plate are coupled together.

With this arrangement, since the linear motion mechanism is received in the linear motion mechanism housing with the components of the linear motion mechanism assembled together, when the linear motion mechanism is detached from the caliper body for maintenance, it is possible to handle the linear motion mechanism as a single assembly, and thus to easily perform maintenance. Also, since the housing-fixing plate, to which the linear motion mechanism housing is detachably fixed, is arranged on the side of the linear motion mechanism housing opposite from the brake disk, the housing-fixing plate, which is a part of the caliper body, can receive the axial reaction force applied to the linear motion mechanism when the liner motion mechanism presses the one of the two friction pads against the brake disk. As described above, the electromechanical brake system is rigid enough to receive the axial reaction force applied to the linear motion mechanism when the linear motion mechanism presses the one of the two friction pads against the bake disk, and also, the linear motion mechanism can be detached as a single assembly.

It is preferable that if the electromechanical brake system further comprises a reduction gear mechanism configured such that the rotation of the electric motor is reduced in speed, and transmitted to the linear motion mechanism by the reduction gear mechanism, a reduction gear mechanism housing is further provided in which the reduction gear mechanism is received as a single assembly with components of the reduction gear mechanism assembled together, and which is detachably fixed to the housing-fixing plate.

With this arrangement, since the reduction gear mechanism is received in the reduction gear mechanism housing with the components of the reduction gear mechanism assembled together, when the reduction gear mechanism is detached from the caliper body for maintenance, it is possible to handle the reduction gear mechanism as a single assembly, and thus to easily perform maintenance.

It is preferable that if the reduction gear mechanism comprises an output gear configured to output the rotation of the electric motor to the linear motion mechanism, and the linear motion mechanism comprises a rotary shaft arranged coaxially with the output gear such that the rotation of the electric motor is input to the rotary shaft from the output gear, the electromechanical brake system further comprises first positioning fitted portions arranged between contact surfaces of the linear motion mechanism housing and the housing-fixing plate that are in contact with each other, and fitted to each other such that a center of the rotary shaft coincides with a center of the output gear.

With this arrangement, when the linear motion mechanism housing is mounted to the housing-fixing plate, the first positioning fitted portions enable the center of the rotary shaft of the linear motion mechanism to coincide with the center of the output gear of the reduction gear mechanism. Therefore, it is possible to more easily mount the linear motion mechanism in position, and to more easily perform maintenance.

It is preferable that the electromechanical brake system further comprises second positioning fitted portions arranged between contact surfaces of the reduction gear mechanism housing and the housing-fixing plate that are in contact with each other, and fitted to each other such that the center of the rotary shaft coincides with the center of the output gear.

With this arrangement, when the reduction gear mechanism housing is mounted to the housing-fixing plate, the second positioning fitted portions enable the center of the rotary shaft of the linear motion mechanism to coincide with the center of the output gear of the reduction gear mechanism. Therefore, it is possible to more easily mount the reduction gear mechanism in position, and to more easily perform maintenance.

The electromechanical brake system may be configured such that the linear motion mechanism housing and the reduction gear mechanism housing are arranged such that the housing-fixing plate is sandwiched between the linear motion mechanism housing and the reduction gear mechanism housing, and the linear motion mechanism housing and the reduction gear mechanism housing are detachably tightened relative to each other by a tightening component, and fixed to the housing-fixing plate.

If the brake disk is configured in this way, when the linear motion mechanism housing is detached from the housing-fixing plate, the reduction gear mechanism housing is also simultaneously detached from the housing-fixing plate, thus enabling easier maintenance.

If the linear motion mechanism comprises a linear motion member configured to move together with the one of the two friction pads, the linear motion mechanism may further comprise a stretchable tubular boot having two ends, with one of the two ends connected to an inner periphery of the linear motion mechanism housing, and the other of the two ends connected to an outer periphery of the linear motion member, so as to prevent foreign matter from entering the linear motion mechanism housing.

If the brake system is configured in this way, it is possible to handle, as a single assembly, the linear motion mechanism and the boot for preventing the entry of foreign matter, and thus to easily perform maintenance. Also, it is possible to prevent foreign matter from entering the sliding portions of the linear motion member and the linear motion mechanism housing.

The electromechanical brake system may further comprise a seal member arranged between the linear motion mechanism housing and the housing-fixing plate so as to prevent foreign matter from entering the linear motion mechanism housing.

If such a seal member is arranged therebetween, it is possible to prevent the entry of foreign matter from between the linear motion mechanism housing and the housing-fixing plate, and thus to provide waterproofness and dustproofness to the electromechanical brake system.

The electromechanical brake system may be configured such that the linear motion mechanism housing (4) is made of a material different from the material of the caliper body (7), for example, the caliper body 7 is made of cast iron, and the linear motion mechanism housing is made of an aluminum alloy, which is more lightweight than cast iron.

The linear motion mechanism housing may have a rotationally symmetrical shape.

If the linear motion mechanism housing has a rotationally symmetrical shape, when mounting, to the housing-fixing plate, the linear motion mechanism housing, in which the linear motion mechanism is received as a single assembly with the components of the linear motion mechanism assembled together, it is not necessary to pay attention to the angular position of the linear motion mechanism housing. Therefore, it is possible to eliminate the risk that the linear motion mechanism housing might be mounted in a wrong angular.

The linear motion mechanism may be a planetary roller mechanism comprising: an outer ring member; planetary rollers configured such that due to the rotation of the electric motor, the planetary rollers revolve around the rotary shaft inside of the outer ring member, while rotating about respective axes of the planetary rollers; a helical rib on an inner periphery of the outer ring member; and a helical groove or circumferential grooves arranged in an outer periphery of each of the planetary rollers such that the helical rib is engaged in the helical groove or the circumferential grooves.

Effects of the Invention

In the electromechanical brake system of the present invention, the linear motion mechanism is received in the linear motion mechanism housing with the components of the linear motion mechanism assembled together, when the linear motion mechanism is detached from the caliper body for maintenance, it is possible to handle the linear motion mechanism as a single assembly, and thus to easily perform maintenance.

BEST MODE FOR CARRYING OUT THE INVENTION

Figure 1:
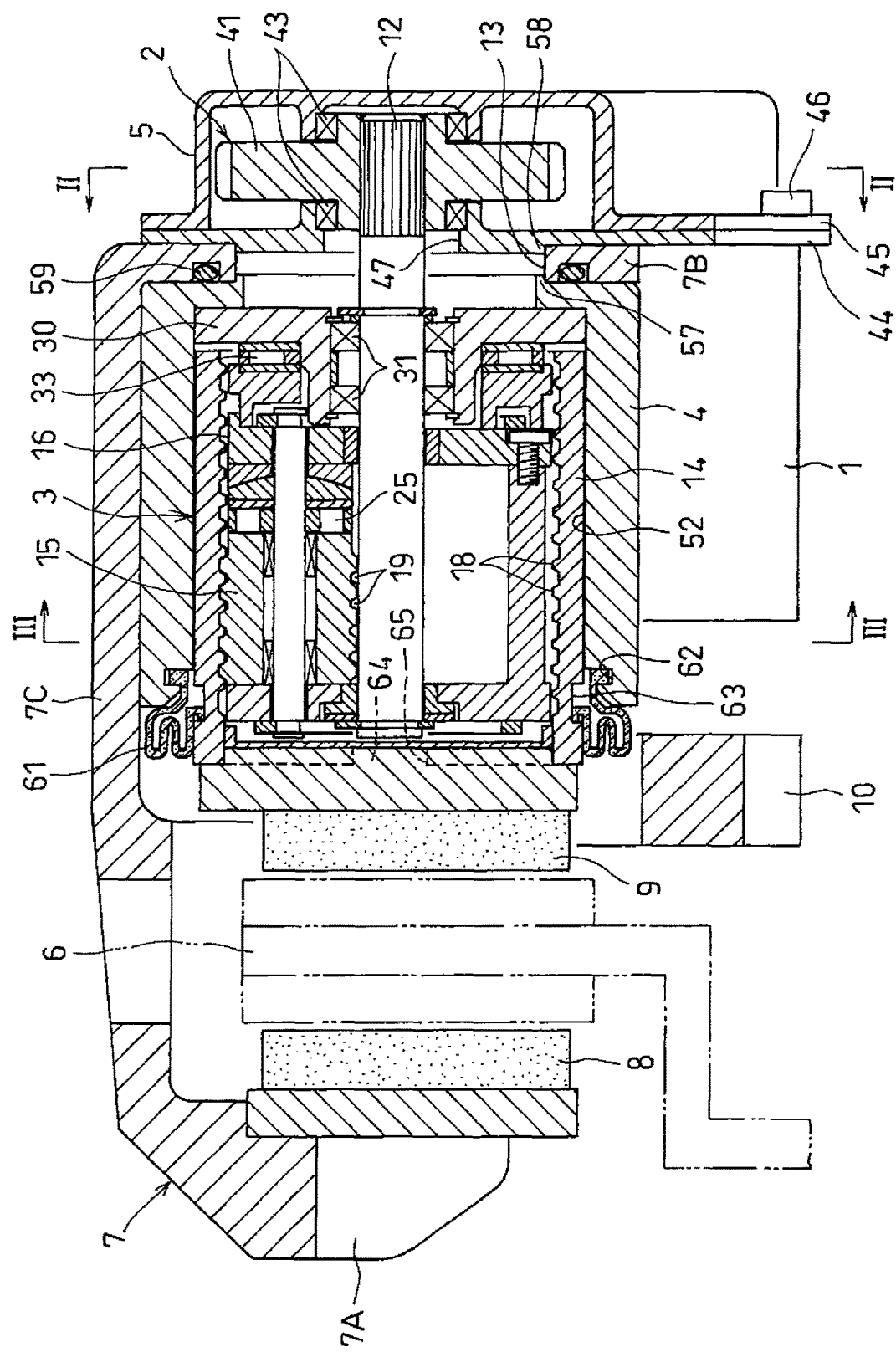
FIG. 1 is a sectional view of an electromechanical brake system embodying the present invention.

FIG. 1 illustrates an electromechanical brake system embodying the present invention, and including an electric motor 1; a reduction gear mechanism 2 configured such that the rotation of the electric motor 1 is reduced in speed, and transmitted by the reduction gear mechanism 2; a linear motion mechanism 3 configured to convert the rotation transmitted from the electric motor 1 through the reduction gear mechanism 2 to a linear motion; a linear motion mechanism housing 4 in which the linear motion mechanism 3 is received; a reduction gear mechanism housing 5 in which the reduction gear mechanism 2 is received; a caliper body 7 shaped to extend across the outer periphery of a brake disk 6; and a pair of friction pads 8 and 9 axially opposed to each other through the brake disk 6.

The caliper body 7 includes a claw portion 7A and a housing-fixing plate 7B axially opposed to each other through the pair of friction pads 8 and 9; and an outer shell portion 7C which is located radially outwardly of the brake disk 6, and through which the claw portion 7A and the housing-fixing plate 7B are coupled together. The brake disk 6 is a disk-shaped member configured to rotate together with a wheel (not show). The caliper body 7 is axially movably supported, through a pair of slide pins 11 (see FIGS. 2 and 3), by a mount 10 fixed to a knuckle (not shown) supporting the wheel. The friction pads 8 and 9 are supported by pad pins (not shown) mounted to the caliper body 7 so as to be axially movable relative to the caliper body 7.

The claw portion 7A axially supports the surface of the friction pad 8 opposite from the surface thereof opposed to the brake disk 6. The housing-fixing plate 7B is a flat plate arranged on the side of the linear motion mechanism housing 4 opposite from, i.e., remoter from the brake disk 6, and extending parallel to the brake disk 6. The housing-fixing plate 7B is formed with a shaft inserting hole 13 through which the below-described rotary shaft 12 of the linear motion mechanism 3 is inserted.

Figure 4:
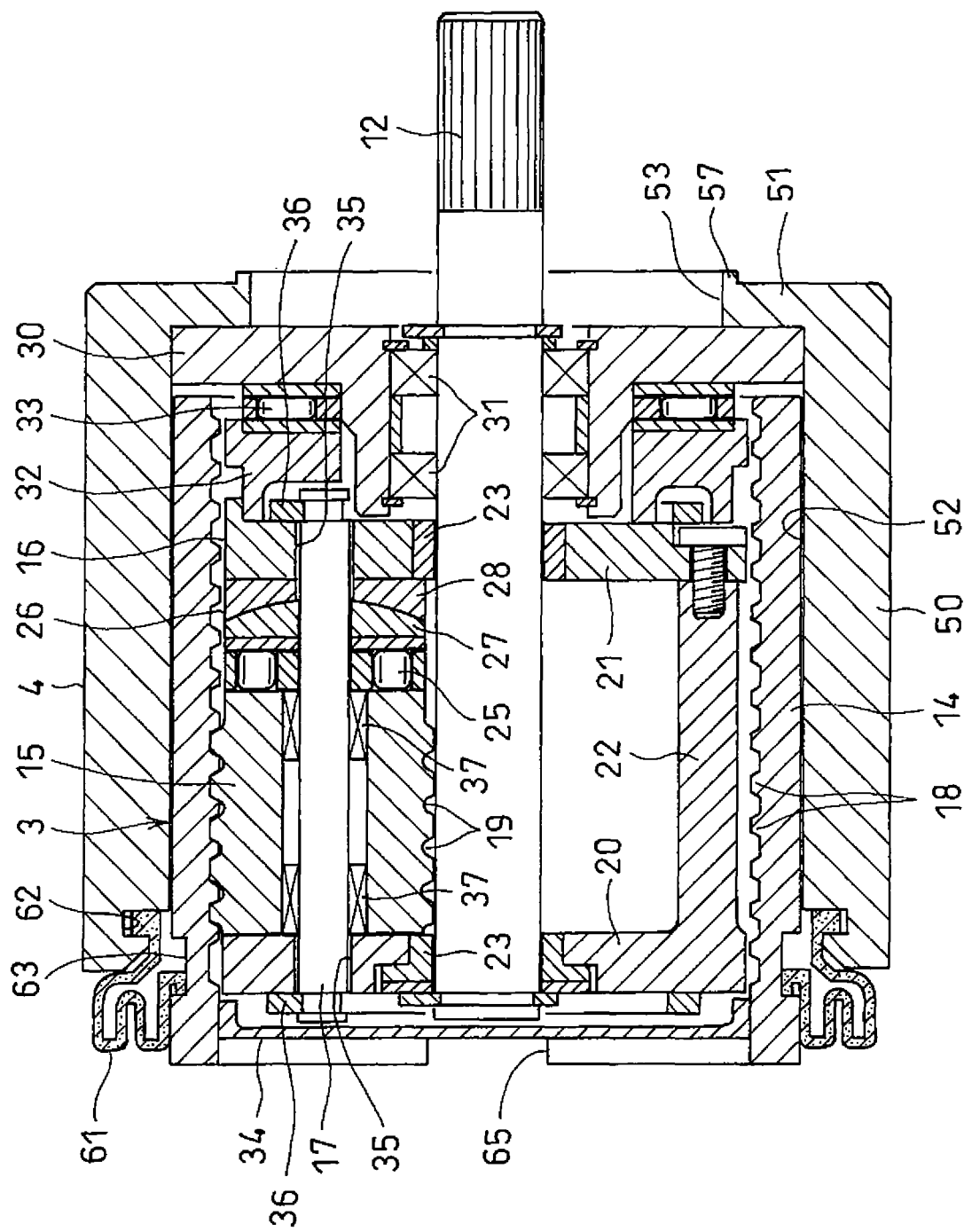
FIG. 4 is a sectional view of a linear motion mechanism housing in which the assembled components of a linear motion mechanism are received, and which is detached from the electromechanical brake system of FIG. 1.

As illustrated in FIG. 4, the linear motion mechanism 3 includes the above-mentioned rotary shaft 12, to which the rotation of the electric motor 1 (see FIG. 1) is transmitted through the reduction gear mechanism 2 (see FIG. 1); a cylindrical outer ring member 14 arranged coaxially with the rotary shaft 12 so as to surround the rotary shaft 12; a plurality of planetary rollers 15 arranged between the outer periphery of the rotary shaft 12 and the inner periphery of the outer ring member 14 so as to be circumferentially spaced apart from each other; and a carrier 16 retaining the planetary rollers 15 such that the planetary rollers 15 can rotate about their respective axes while revolving around the rotary shaft 12.

The carrier 16 includes a pair of disks 20 and 21 axially opposed to each other through the planetary rollers 15; coupling portions 22 through which the disks 20 and 21 are coupled together; and roller shafts 17 mounted to the centers of the respective planetary rollers 15, and supporting the respective planetary rollers 15 such that the planetary rollers 15 are rotatable about their axes. The disks 20 and 21 are annularly shaped such that the rotary shaft 12 extends through the disks 20 and 21. Sliding bearings 23 are mounted on the inner peripheries of the respective disks 20 and 21, along which the rotary shaft 12 extends, and are kept in sliding contact with the outer periphery of the rotary shaft 12. Each of the disks 20 and 21 has radially elongated insertion holes 35 through which the respective roller shafts 17 are inserted such that each roller shaft 17 is movable until the roller shaft 17 abuts against the ends of the corresponding insertion holes 35 of the disks 20 and 21. The roller shafts 17 are inwardly biased by radially elastically deformable elastic rings 36 each wrapped around the respective ends of the roller shafts 17.

As a result thereof, each planetary roller 15 is also inwardly biased through sliding bearings 37 mounted between the roller shaft 17 and the planetary roller 15, and thus is kept in rolling contact with the outer periphery of the rotary shaft 12. The portion of the outer periphery of the rotary shaft 15 with which the planetary rollers 15 come into contact is a cylindrical surface. Therefore, when the rotary shaft 12 rotates, the planetary rollers 15 revolve around the rotary shaft 12, inside of the outer ring member 14, while rotating about the respective roller shafts 17.

The outer ring member 14 has, on its inner periphery, a helical rib 18 having a predetermined lead angle, i.e., extending obliquely with respect to the circumferential direction. Each planetary roller 15 includes, in its outer periphery, a plurality of axially spaced apart circumferential grooves 19 in which the helical rib 18 is engaged. Instead of such circumferential grooves 19, i.e., grooves having a 0 degree lead angle, each planetary roller 15 may have a helical groove having a lead angle different from that of the helical rib 18.

A thrust bearing 25 is mounted between each planetary roller 15 and the disk 21 so as to support the planetary roller 15 such that the planetary roller 15 is rotatable about its axis. An aligning seat 26 is mounted between each thrust bearing 25 and the disk 21 so as to support the corresponding planetary roller 15 through the thrust bearing 25 such that the planetary roller 15 is inclinable. Each aligning seat 26 comprises a pressure applying seat plate 27 provided with a convex spherical surface having a center on the center axis of the corresponding roller shaft 17; and a pressure receiving seat plate 28 provided with a concave surface slidably supporting the convex spherical surface of the pressure applying seat plate 27.

A bearing supporting member 30 having a circular annular shape is mounted inside of the linear motion mechanism housing 4, on the side of the outer ring member 14 opposite from, i.e., remoter from the brake disk 6. Radial bearings 31 are mounted on the inner periphery of the bearing supporting member 30 so as to rotatably support the rotary shaft 12. Mounted between the bearing supporting member 30 and the carrier 16 are a spacer 32 configured to revolve around the rotary shaft 12 together with the carrier 16; and a thrust bearing 33 supporting the carrier 16 through the spacer 32 such that the carrier 16 can revolve around the rotary shaft 12.

A seal cover 34 is mounted to the open end of the outer ring member 14 closer to the brake disk 6 (see FIG. 1) so as to close this open end, thereby preventing foreign matter from entering the outer ring member 14.

Figure 2:
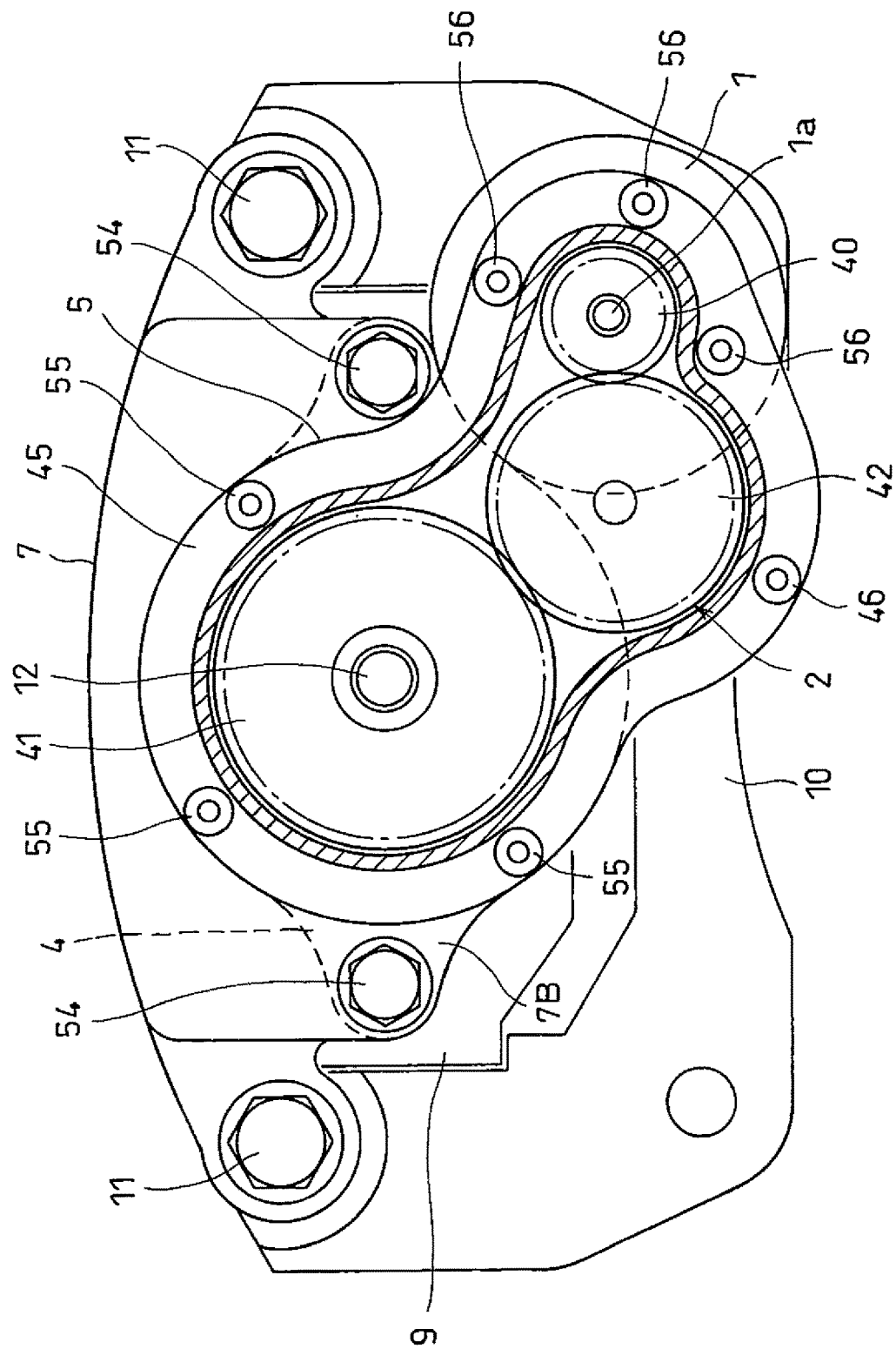
FIG. 2 is a sectional view taken along line II-II of FIG. 1.

As illustrated in FIG. 2, the reduction gear mechanism 2 includes an input gear 40 to which the rotation of the motor shaft 1a of the electric motor 1 is input; an output gear 41 from which the rotation is output to the linear motion mechanism 3; and an intermediate gear 42 through which the rotation input to the input gear 40 is transmitted to the output shaft 41. The output gear 41 is rotatably supported by a pair of rolling bearings 43 (see FIG. 1) mounted in the reduction gear mechanism housing 5. Similarly, the input and intermediate gears 40 and 42 are also rotatably supported by rolling bearings (not shown) mounted in the reduction gear mechanism housing 5 The output gear 41 is fitted on the outer periphery of the rotary shaft 12 by spline fitting so that the rotation transmitted to the output gear 41 is transmitted to the rotary shaft 12 through the output gear 41.

As illustrated in FIG. 1, the reduction gear mechanism housing 5 comprises a side plate 44 supported by the housing-fixing plate 7B of the caliper body 7; and a lid plate 45 defining, between the side plate 44 and the lid plate 45, a space in which the gears 40, 41 and 42 of the reduction gear mechanism 2 (see FIG. 2) are received. The reduction gear mechanism housing 5 receives the reduction gear mechanism 2 as a single assembly with the components (gears 40, 41, 42) of the reduction gear mechanism 2 assembled together, and can be attached to and detached from the caliper body 7 in this state. Namely, the reduction gear mechanism 2 can be detached from the caliper body 7 with the intermediate gear 42 kept in mesh with the input gear 40 and the output gear 42. One of the two rolling bearings 43, which support the output gear 41, is mounted to the side plate 44, and the other rolling bearing 43 is mounted to the lid plate 45. The side plate 44 and the lid plate 45 are coupled together by a bolt 46. The side plate 44 is formed with a hole 47 through which the rotary shaft 12 is inserted.

As illustrated in FIG. 4, the linear motion mechanism housing 4 receives the linear motion mechanism 3 as a single assembly with the components of the linear motion mechanism 3 assembled together, and can be attached to and detached from the caliper body 7 (see FIG. 1) in this state. Namely, the linear motion mechanism 3 can be detached from the caliper body 7 with the components of the linear motion mechanism 3 assembled together. The linear motion mechanism housing 4 includes a tubular receiving portion 50 in which the outer ring member 14 is axially slidably received; and an end plate 51 arranged at one end of the tubular receiving portion 50. The tubular receiving portion 50 has, on its inner periphery, a cylindrical sliding surface 52 axially slidably supporting the outer ring member 14. The end plate 51 is formed with a hole 53 through which the rotary shaft 12 is inserted. The end plate 51 axially supports the bearing supporting member 30, and restricts the movement of the bearing supporting member 30 in the direction away from the brake disk 6 (see FIG. 1).

As illustrated in FIG. 1, the linear motion mechanism housing 4 and the reduction gear mechanism housing 5 are arranged on the respective opposite sides of the housing-fixing plate 7B such that the housing-fixing plate 7B is sandwiched between the housings 4 and 5. The linear motion mechanism housing 4 is detachably fixed to the housing-fixing plate 7B by bolts 54 (see FIGS. 2, 5, and 6). As illustrated in FIG. 2, the reduction gear mechanism housing 5 is detachably fixed to the housing-fixing plate 7B by bolts 55, which are different bolts from the bolts 54. The electric motor 1 is fixed to the reduction gear mechanism housing 5 by bolts 56. The motor shaft 1a of the electric motor 1 is inserted in and coupled to the input gear 40 of the reduction gear mechanism 2.

As illustrated in FIG. 1, a circular annular step 57 concentric with the rotary shaft 12 is formed on the contact surface of the linear motion mechanism housing 4 kept in contact with the housing-fixing plate 7B. The step 57 is fitted on the inner periphery of the shaft inserting hole 13 of the housing-fixing plate 7B, thereby positioning the linear motion mechanism housing 4 with respect to the housing-fixing plate 7B such that the center of the rotary shaft 12 coincides with the center of the output gear 41. The step 57 of the linear motion mechanism housing 4 and the shaft inserting hole 13 of the housing-fixing plate 7B constitute first positioning fitted portions fitted to each other such that the center of the rotary shaft 12 coincides with the center of the output gear 41.

Similarly, a circular annular step 58 concentric with the output shaft 41 is formed on the contact surface of the reduction gear mechanism housing 5 kept in contact with the housing-fixing plate 7B. The step 58 is fitted on the inner periphery of the shaft inserting hole 13 of the housing-fixing plate 7B, thereby positioning the reduction gear mechanism housing 5 with respect to the housing-fixing plate 7B such that the center of the rotary shaft 12 coincides with the center of the output gear 41. The step 58 of the reduction gear mechanism housing 5 and the shaft inserting hole 13 of the housing-fixing plate 7B constitute second positioning fitted portions fitted to each other such that the center of the rotary shaft 12 coincides with the center of the output gear 41.

Figure 6:
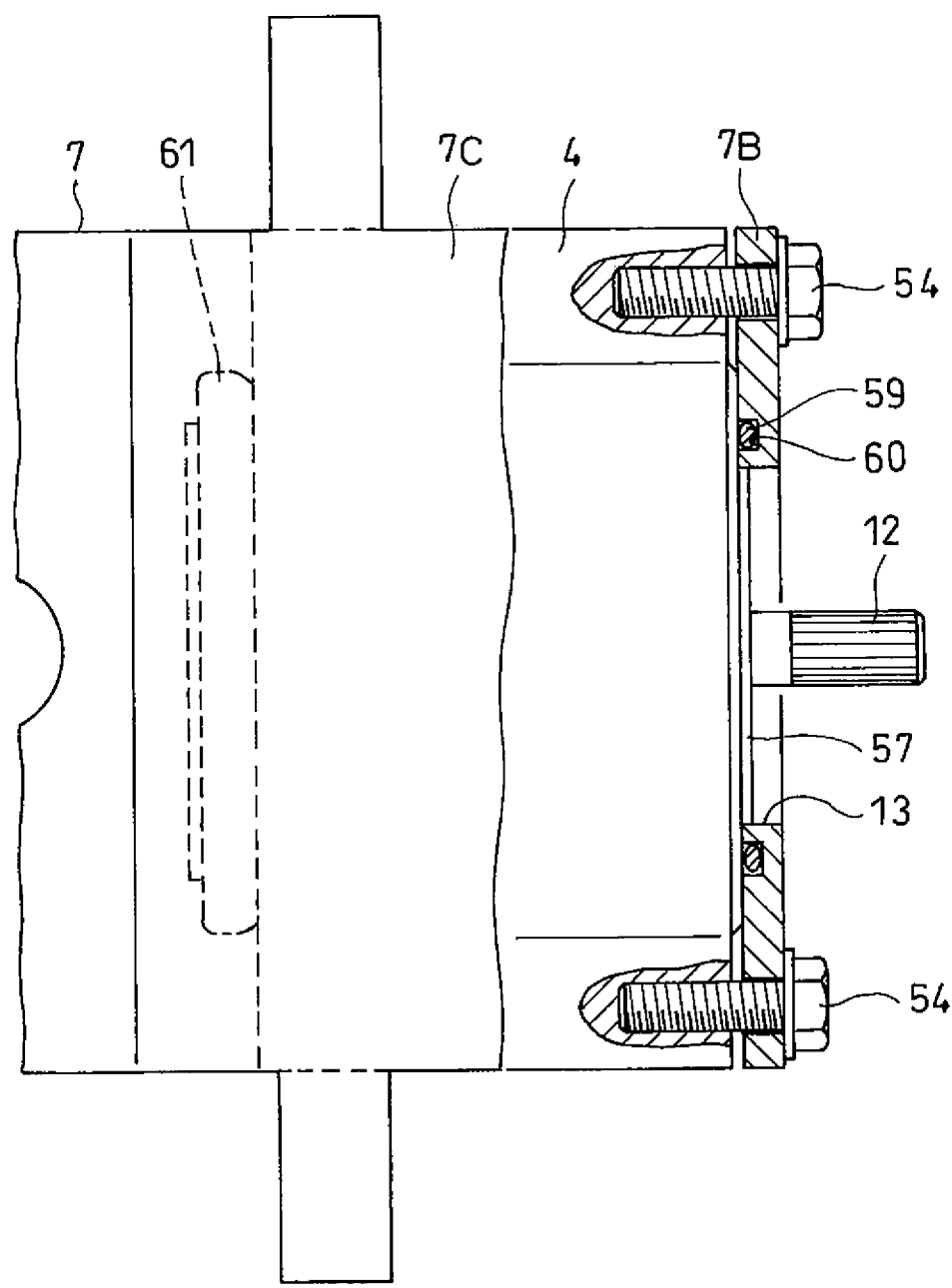
FIG. 6 is a partially sectional view, when seen from the radially outward position of a brake disk, of the linear motion mechanism housing of FIG. 5, in which the assembled components of the linear motion mechanism are received, and which is attached to the caliper body.

As illustrated in FIG. 6, a seal member 59 is arranged between the linear motion mechanism housing 4 and the housing-fixing plate 7B, and is fitted in a seal groove 60 formed in the housing-fixing plate 7B, thereby preventing foreign matter from entering the linear motion mechanism housing 4. The seal member 59 is, e.g., an O-ring made of rubber, and having a round cross section. The seal groove 60 is a circular annular groove formed in the contact surface of the housing-fixing plate 7B kept in contact with the linear motion mechanism housing 4 so as to surround the shaft inserting hole 13. Thus, the seal member 59 separates the portion of the interface between the linear motion mechanism housing 4 and the housing-fixing plate 7B located radially inwardly of the seal member 59, from the portion of the interface located radially outwardly of the seal member 59, thereby preventing the entry of foreign matter from between the linear motion mechanism housing 4 and the housing-fixing plate 7B, and thus to provide waterproofness and dust-proofness to the electromechanical brake system. The circular annular seal groove 60 may be formed in the contact surface of the linear motion mechanism housing 4 kept in contact with the housing-fixing plate 7B so as to surround the shaft inserting hole 13.

As illustrated in FIG. 1, a boot 61 is mounted to the end of the linear motion mechanism housing 4 closer to the brake disk 6 so as to prevent foreign matter from entering the linear motion mechanism housing 4. The boot 61 is a tubular member folded like a bellows so as to be stretchable in the axial direction. One end of the boot 61 is connected to a groove 62 formed in the inner periphery of the linear motion mechanism housing 4, and the other end of the boot 61 is connected to a groove 63 formed in the outer periphery of the outer ring member 14. This structure not only prevents the sliding surface 52 of the outer ring member 14 from being exposed to the outside of the housing 4, but also enables the linear motion mechanism 3 and the boot 61 to be handled as a single assembly (see FIG. 4).

An engagement protrusion 64 is formed on the surface of the friction pad 9 on its back side, while an engagement recess 65 is formed in the end of the outer ring member 14 closer to the brake disk 6 such that the engagement protrusion 64 is engaged in the engagement recess 65, thereby rotationally fixing the outer member 14.

Figure 3:
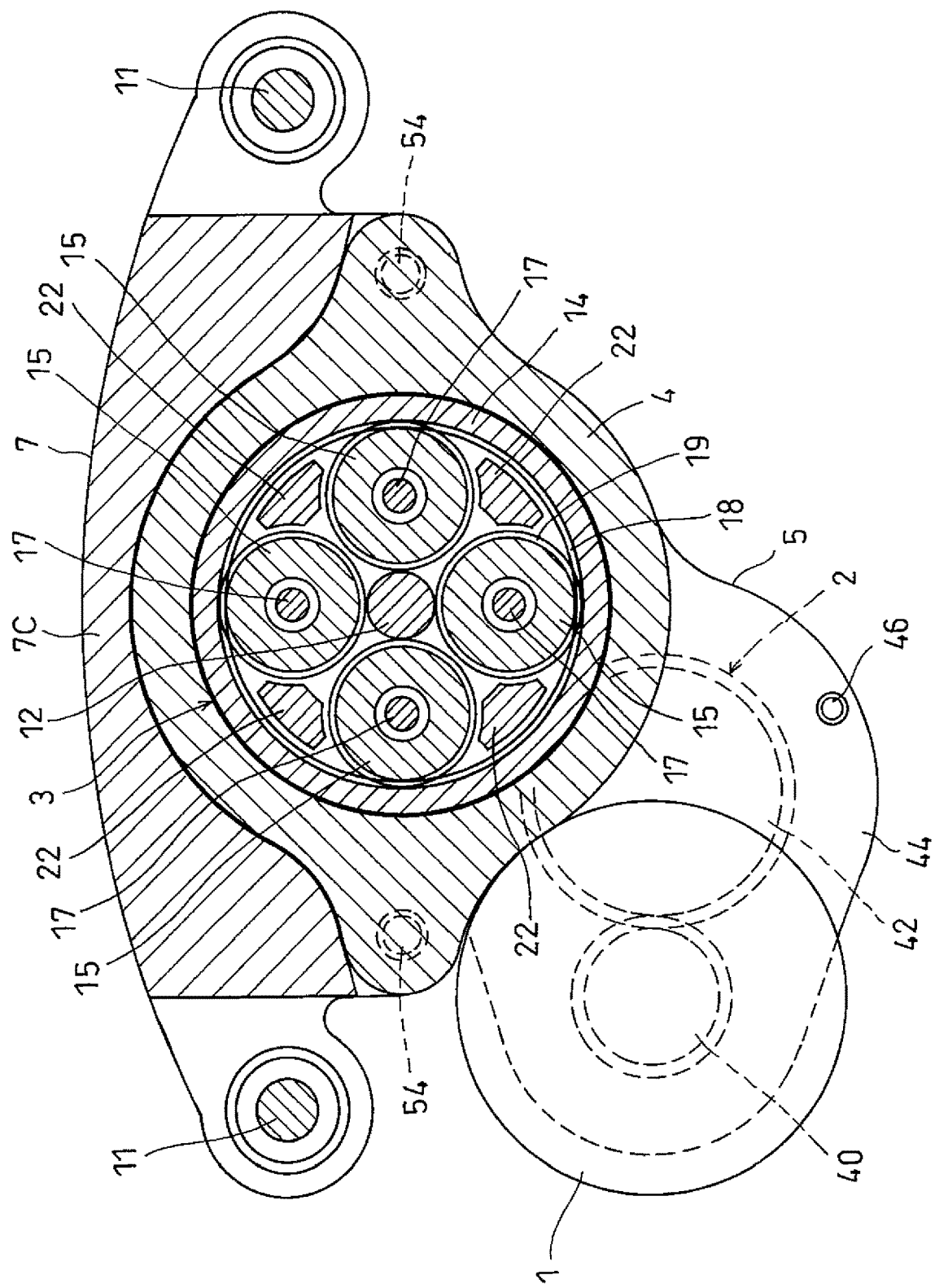
FIG. 3 is a sectional view taken along line III-III of FIG. 1.

In this embodiment, as illustrated in FIG. 3, the linear motion mechanism housing 4 has a rotationally symmetrical shape such that its cross-sectional view remains the same even after rotated about the rotary shaft 12 by 180 degrees. However, the linear motion mechanism housing 4 may have a rotationally symmetrical shape such that its cross-sectional view remains the same when rotated about the rotary shaft 12 by 120 degrees or 90 degrees.

The outer shell portion 7C of the caliper body 7, which is located radially outwardly of the brake disk 6 (see FIG. 1), is opposed to the outer periphery of the linear motion mechanism housing 4. When the linear motion mechanism 3 pushes the friction pad 9 against the brake disk 6, the axial reaction force applied to the linear motion mechanism 3 is received by the housing-fixing plate 7B through the linear motion mechanism housing 4 (see FIG. 1), and the axial reaction force which the housing-fixing plate 7 receives at this time might deform the outer shell portion 7C. In order to prevent such deformation of the outer shell portion 7C, the outer shell portion 7C is designed such that the thickness of the portion of the outer shell portion 7C opposed to the linear motion mechanism housing 4 gradually increases from the circumferential center of this opposed portion toward both sides thereof, thereby increasing the flexural rigidity of the outer shell portion 7C. Also, by designing the outer shell portion 7C in this way, it is possible to increase not only the flexural rigidity of the outer shell portion 7C but also the rigidity of the housing-fixing plate 7B, which is connected to the outer shell portion 7C.

The linear motion mechanism housing 4 is made of a material different from the material of the caliper body 7. For example, the caliper body 7 is made of cast iron, and the linear motion mechanism housing 4 is made of an aluminum alloy, which is more lightweight than cast iron. By using a material more lightweight than the material of the caliper body 7 for the linear motion mechanism housing 4, it is possible to reduce the overall weight of the electromechanical brake system.

It is now described how the above-described electromechanical brake system operates.

When the electric motor 1 (see FIG. 1) rotates, the rotation of the electric motor 1 is input to the rotary shaft 12 through the reduction gear mechanism 2, so that the planetary rollers 15 revolve around the rotary shaft 12 while rotating about their respective axes. This allows the outer ring member 14 and the planetary rollers 15 to axially move relative to each other due to the engagement of the helical rib 18 of the outer ring member 14 in the circumferential grooves 19 of the respective planetary rollers 15. However, since the axial movements of the planetary rollers 15 as well as the carrier 16 are restricted, the planetary rollers 15 do not move in the axial direction, so that only the outer ring member 14 moves in the axial direction. In this way, the linear motion mechanism 3 converts the rotation transmitted from the electric motor 1 to the linear motion of the outer ring member 14; moves the friction pad 9 together with the outer ring member 14; and presses the friction pad 9 against the brake disk 6, thereby generating a braking force.

When the rotation transmitted from the electric motor 1 is converted to the linear motion of the outer ring member 14 by the linear motion mechanism 3, and thus the friction pad 9 is pressed against the brake disk 6, an axial reaction force is applied to the linear motion mechanism 3, and is received by the housing-fixing plate 7B through the linear motion mechanism housing 4.

In the electromechanical brake system of the present invention, since the linear motion mechanism 3 is received in the linear motion mechanism housing 4 with the components of the linear motion mechanism 3 assembled together, when the linear motion mechanism 3 needs to be detached from the caliper body 7 for maintenance, by removing the bolts 54, and detaching the linear motion mechanism housing 4 from the housing-fixing plate 7B, it is possible to detach and handle the linear motion mechanism 3 as a single assembly, and thus to easily perform maintenance.

In the electromechanical brake system of the present invention, since the housing-fixing plate 7B, to which the linear motion mechanism housing 4 is detachably fixed, is arranged on the side of the linear motion mechanism housing 4 remoter from the brake disk 6, the housing-fixing plate 7B, which is a part of the caliper body 7, can receive the axial reaction force applied to the linear motion mechanism 3 when the liner motion mechanism 3 presses the friction pad 9 against the brake disk 6.

Namely, the electromechanical brake system of the present invention is rigid enough to receive the axial reaction force applied to the linear motion mechanism 3 when the linear motion mechanism 3 presses the friction pad 9 against the bake disk 6, and also, the linear motion mechanism 3 can be detached as a single assembly. In this way, the electromechanical brake system is axially rigid, and also enables easy maintenance.

In the electromechanical brake system of the present invention, since the reduction gear mechanism 2 is received in the reduction gear mechanism housing 5 with the components of the reduction gear mechanism 2 assembled together, when the reduction gear mechanism 2 needs to be detached from the caliper body 7 for maintenance, by removing the bolts 55, and detaching the reduction gear mechanism housing 5 from the housing-fixing plate 7B, it is possible to detach and handle the reduction gear mechanism 2 as a single assembly, and thus to easily perform maintenance.

Since the electromechanical brake system of the present invention is configured such that the center of the rotary shaft 12 of the linear motion mechanism 3 coincides with the center of the output gear 41 of the reduction gear mechanism 2 by fitting the step 57 of the linear motion mechanism housing 4 onto the shaft inserting hole 13 of the housing-fixing plate 7B when mounting the linear motion mechanism housing 4 to the housing-fixing plate 7B, it is possible to easily mount the linear motion mechanism 3 in position, and to easily perform maintenance.

Since the electromechanical brake system of the present invention is configured such that the center of the rotary shaft 12 of the linear motion mechanism 3 coincides with the center of the output gear 41 of the reduction gear mechanism 2 by fitting the step 58 of the reduction gear mechanism housing 5 onto the shaft inserting hole 13 of the housing-fixing plate 7B when mounting the reduction gear mechanism housing 5 to the housing-fixing plate 7B, it is possible to easily mount the reduction gear mechanism 2 in position, and to easily perform maintenance.

In the electromechanical brake system of the present invention, since the linear motion mechanism housing 4 has a rotationally symmetrical shape as illustrated in FIG. 3, when mounting, to the housing-fixing plate 7B, the linear motion mechanism housing 4, in which the linear motion mechanism 3 is received as a single assembly with the components of the linear motion mechanism 3 assembled together, it is not necessary to pay attention to the angular position of the linear motion mechanism housing 4. Therefore, it is possible to eliminate the risk that the linear motion mechanism 3 as a single assembly might be mounted in a wrong angular position.

In the electromechanical brake system of the present invention, since the sliding surface 52 for sliding the outer ring member 14 is formed on the linear motion mechanism housing 4, which can be detached from the caliper body 7, it is possible to easily form the sliding surface 52.

Figure 5:
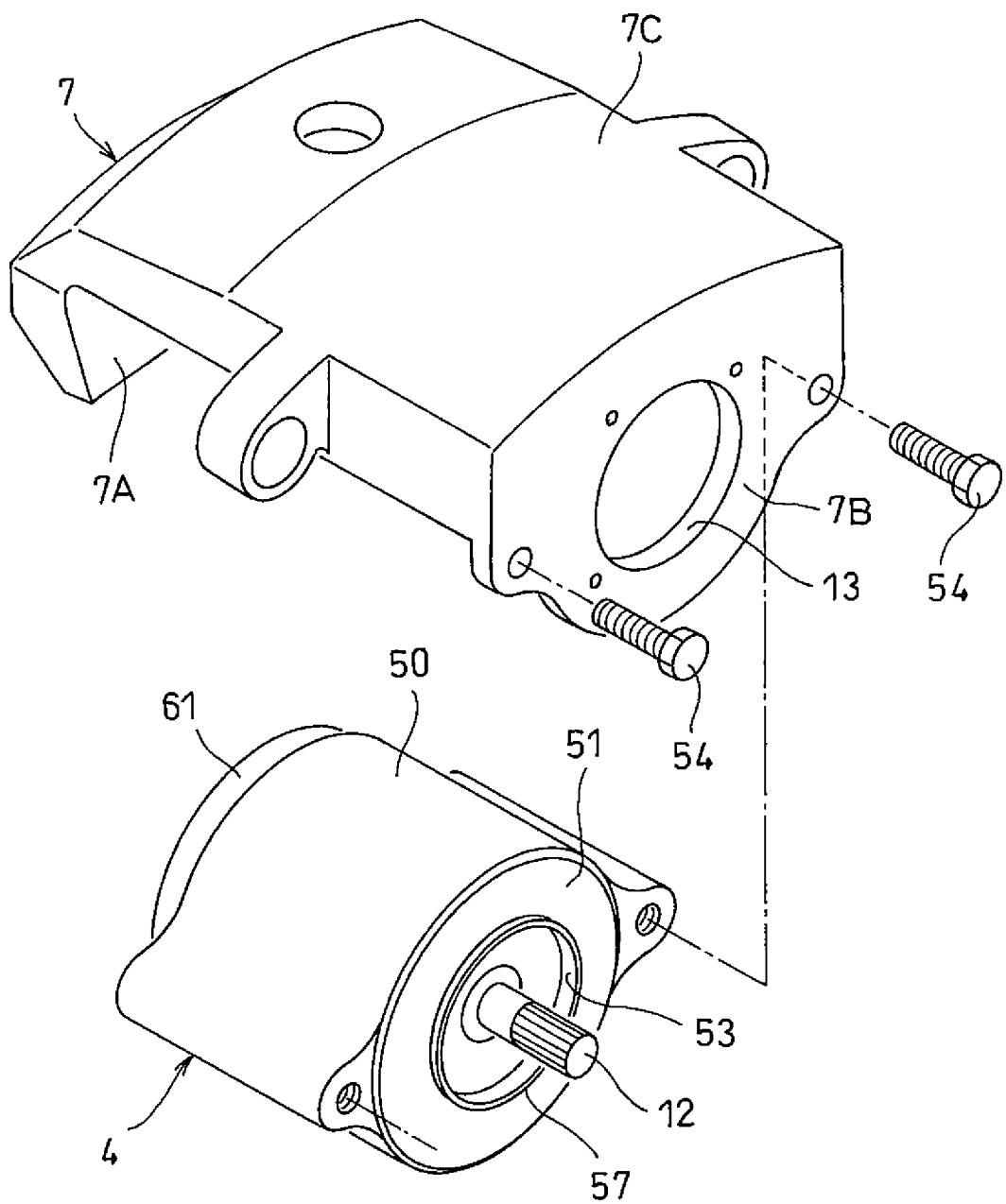
FIG. 5 is a perspective view illustrating the disassembled state of a caliper body and the linear motion mechanism housing, in which the assembled components of the linear motion mechanism are received.

Since the electromechanical brake system of the present invention is configured such that, with the linear motion mechanism 3 received in the linear motion mechanism housing 4, the linear motion mechanism housing 4 can be mounted to the caliper body 7 from radially inwardly of the brake disk 6, it is possible to design the shape of the claw portion 7A relatively freely, unlike the electromechanical brake system illustrated in FIG. 5 of Japanese Unexamined Patent Application Publication No. 2007-037305, in which the shape of the claw portion is limited. (That is, in this publication, since the linear motion mechanism has to be axially inserted from the side of the brake system where there is the claw portion, the claw portion has to be designed and shaped to prevent interference of the linear motion mechanism with the claw portion when the former is axially inserted into the caliper body.)

If bolts 54 are used as tightening components for fixing the linear motion mechanism housing 4 to the housing-fixing plate 7B, the bolts 54 may be each any kind of bolt. While, in FIGS. 2, 5 and 6, the bolts 54 are inserted through respective through holes formed in the housing-fixing plate 7B such that the threaded portions of the bolts 54 are engaged in respective threaded holes formed in the linear motion mechanism housing 4, the insertion direction of the bolts 54 may be inverted. Namely, the bolts 54 may be inserted through respective through holes formed in the linear motion mechanism housing 4 from the side of the linear motion mechanism housing 4 closer to the claw portion 7 such that the threaded portions of the bolts 54 are engaged in respective threaded holes formed in the housing-fixing plate 7B.

Figure 7:
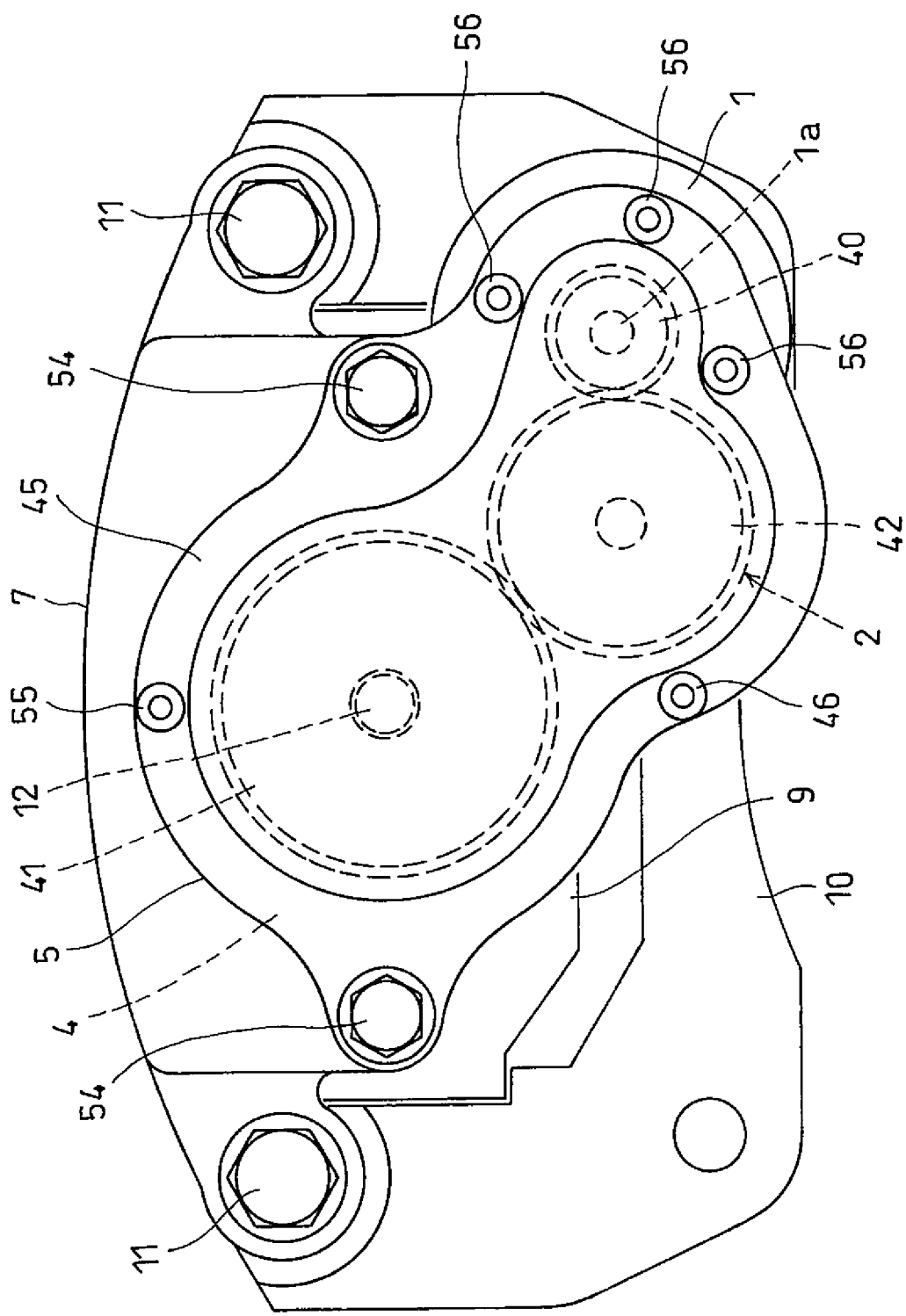
FIG. 7 is a view illustrating a variation of the reduction gear mechanism housing of FIG. 2.

While, in FIG. 2, the bolts 54 used for fixing the linear motion mechanism housing 4 to the housing-fixing plate 7B are different bolts from the bolts 55 used for fixing the reduction gear mechanism housing 5 to the housing-fixing plate 7B, only the bolts 54 may be used for fixing both the linear motion mechanism housing 4 and the reduction gear mechanism housing 5 to the housing-fixing plate 7B as illustrated in FIG. 7. Namely, the linear motion mechanism housing 4 and the reduction gear mechanism housing 5 may be detachably tightened relative to each other by common tightening components (bolts 54), and fixed to the housing-fixing plate 7B. If these housings 4 and 5 are fixed in this way, when the linear motion mechanism housing 4 is detached from the housing-fixing plate 7B, the reduction gear mechanism housing 5 is also simultaneously detached from the housing-fixing plate 7B, thus enabling easier maintenance.

While, in FIG. 2, the housing of the electric motor 1 is provided separately from the reduction gear mechanism housing 5, the former housing may be integral with the latter housing 5.

Figure 8:
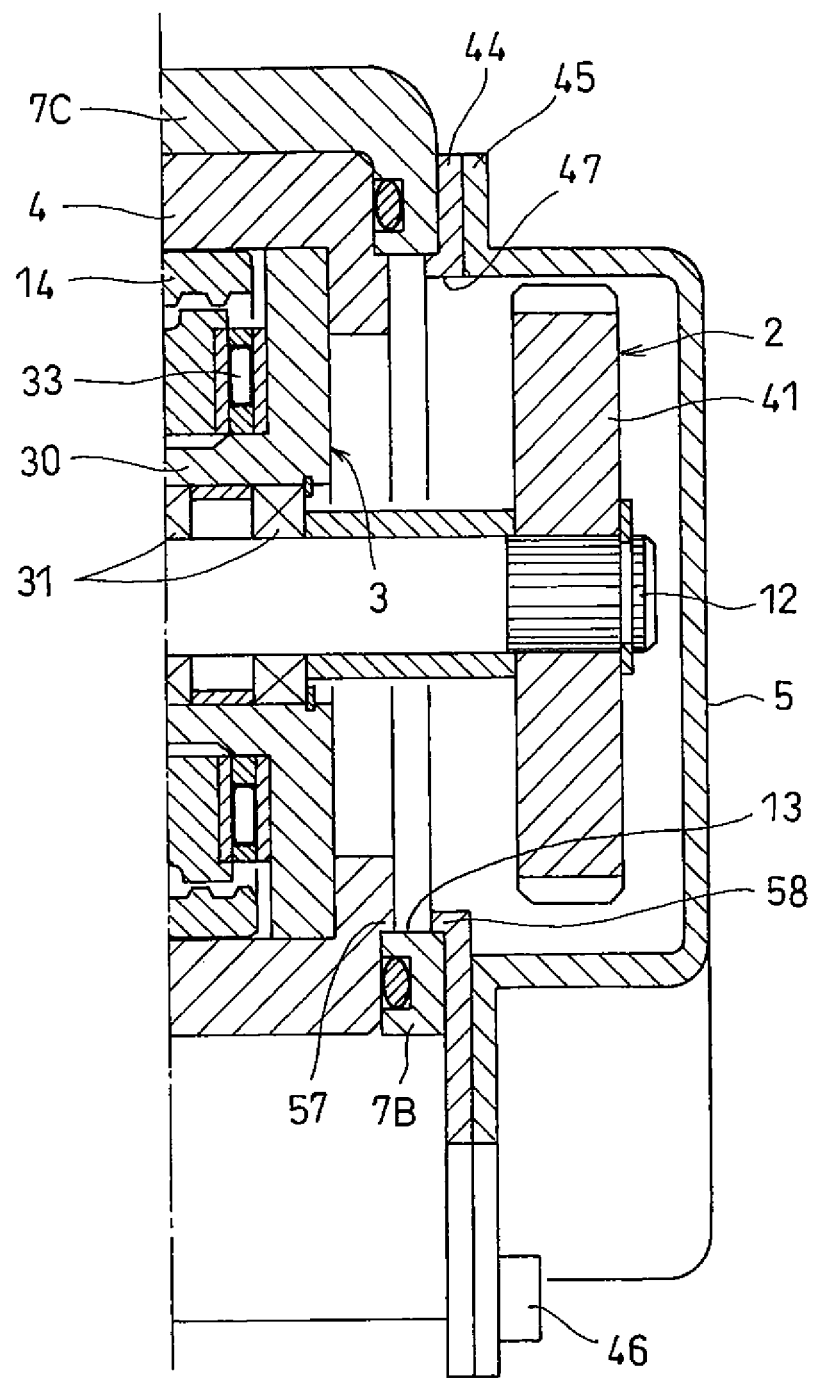
FIG. 8 is a partially sectional view illustrating a variation of the reduction gear mechanism housing of FIG. 1, in which no rolling bearings are mounted in the reduction gear mechanism housing.

While, in FIG. 1, rolling bearings 43 are mounted to the reduction gear mechanism 5 so as to rotatably support the output gear 41, the rolling bearings 43 may be dispensed with so that the output gear 41 is supported by only the rotary shaft 12 as illustrated in FIG. 8. In this case, by setting the diameter of the shaft inserting hole 13 of the housing-fixing plate 7B, and the diameter of the hole 47 in the side plate 44 of the reduction gear mechanism housing 5 to be each larger than the outer diameter of the output gear 41, it is possible to attach and detach the linear motion mechanism 3 and the output gear 41 as a single assembly. In this case, too, as in the above embodiment, due to the fitting of the step 57 of the linear motion mechanism housing 4 in the shaft inserting hole 13 of the housing-fixing plate 7B, and the fitting of the step 58 of the reduction gear mechanism housing 5 in the shaft inserting hole 13 of the housing-fixing plate 7B, the output gear 41 and the intermediate gear 42 (see FIG. 2) are positioned relative to each other such that the backlash (clearance) between the output and intermediate gears 41 and 42 is kept at an appropriate size.

While, in the above embodiment, the linear motion mechanism 3 is a planetary roller mechanism in which the outer ring member 14 axially moves when the planetary rollers 15 revolve around the rotary shaft 12, the linear motion mechanism 3 may be a planetary roller mechanism in which the carrier 16 axially moves when the planetary rollers 15 revolve around the rotary shaft 12.

The above embodiment is merely an example in every respect, and the present invention is not limited to the above embodiment. Also, it should be understood that the scope of the present invention is indicated not by the above explanations but by the claims, and can include all modifications within the scope of the claims and the meaning equivalent to the scope of the claims.

DESCRIPTION OF REFERENCE NUMERALS

1: electric motor
2: reduction gear mechanism
3: linear motion mechanism
4: linear motion mechanism housing
5: reduction gear mechanism housing
6: brake disk
7: caliper body
7A: claw portion
7B: housing-fixing plate
7C: outer shell portion
8, 9: friction pad
12: rotary shaft
13: shaft inserting hole
14: outer ring member
15: planetary roller
18: helical rib
19: circumferential groove
41: output gear
54: bolt
57: step
58: step
59: seal member
61: boot

The invention claimed is:

1. An electromechanical brake system comprising:
an electric motor;
two friction pads axially opposed to each other through a brake disk;
a linear motion mechanism including
a rotary shaft to which rotation of the electric motor is transmitted, and
an outer ring member, the linear motion mechanism being configured to convert rotation of the rotary shaft to a linear motion of the outer ring member, thereby pressing one of the two friction pads against the brake disk;
a linear motion mechanism housing in which the linear motion mechanism is received as a single assembly with components of the linear motion mechanism assembled together; and
a caliper body shaped to extend across an outer periphery of the brake disk,
wherein the linear motion mechanism housing includes a tubular receiving portion in which the outer ring member is axially slidably received, and an end plate disposed at one end of the tubular receiving portion, the tubular receiving portion having an inner periphery on which a cylindrical sliding surface is formed, the cylindrical sliding surface axially slidably supporting the outer ring member, wherein the end plate has a hole through which the rotary shaft is inserted,
wherein the caliper body comprises:
a claw portion axially supporting the other of the two friction pads;
a housing-fixing plate which is disposed on a side of the linear motion mechanism housing which is axially farthest from the brake disk, and to which the linear motion mechanism housing is detachably fixed such that the linear motion mechanism housing is dismountable from the housing-fixing plate in a direction radially inwardly of the brake disk, wherein the housing-fixing plate has a shaft inserting hole through which the rotary shaft is inserted; and
an outer shell portion which is located radially outwardly of the brake disk, and through which the claw portion and the housing-fixing plate are coupled together,
wherein the end plate has a contact surface configured to be brought into contact with the housing-fixing plate, the contact surface being formed with a circular annular step concentric with the rotary shaft, wherein the circular annular step is fitted on an inner periphery of the shaft inserting hole, the circular annular step having an axial height smaller than an axial thickness of the housing-fixing plate.

2. The electromechanical brake system according to claim 1, wherein the linear motion mechanism further comprises a linear motion member configured to move together with the one of the two friction pads; and
a stretchable tubular boot having two ends, with one of the two ends connected to an inner periphery of the linear motion mechanism housing, and the other of the two ends connected to an outer periphery of the linear motion member, so as to prevent foreign matter from entering the linear motion mechanism housing.

3. The electromechanical brake system according to claim 1, further comprising a seal member arranged between the linear motion mechanism housing and the housing-fixing plate so as to prevent foreign matter from entering the linear motion mechanism housing.

4. The electromechanical brake system according to claim 1, wherein the linear motion mechanism housing is made of a material different from a material of the caliper body.

5. The electromechanical brake system according to claim 1, wherein the linear motion mechanism housing has a rotationally symmetrical shape.

6. The electromechanical brake system according to claim 1, wherein the linear motion mechanism is a planetary roller mechanism comprising:
the outer ring member;
planetary rollers configured such that due to the rotation of the electric motor, the planetary rollers revolve around the rotary shaft inside of the outer ring member, while rotating about respective axes of the planetary rollers;
a helical rib on an inner periphery of the outer ring member; and
a helical groove or circumferential grooves arranged in an outer periphery of each of the planetary rollers such that the helical rib is engaged in the helical groove or the circumferential grooves.

7. The electromechanical brake system according to claim 1, further comprising a reduction gear mechanism configured such that the rotation of the electric motor is reduced in speed, and transmitted to the linear motion mechanism by the reduction gear mechanism; and
a reduction gear mechanism housing in which the reduction gear mechanism is received as a single assembly with components of the reduction gear mechanism assembled together, and which is detachably fixed to the housing-fixing plate.

8. The electromechanical brake system according to claim 7, wherein the linear motion mechanism housing and the reduction gear mechanism housing are arranged such that the housing-fixing plate is sandwiched between the linear motion mechanism housing and the reduction gear mechanism housing, and
wherein the linear motion mechanism housing and the reduction gear mechanism housing are detachably tightened relative to each other by a tightening component, and fixed to the housing-fixing plate.

9. The electromechanical brake system according to claim 8, further comprising a seal member arranged between the linear motion mechanism housing and the housing-fixing plate so as to prevent foreign matter from entering the linear motion mechanism housing.

10. The electromechanical brake system according to claim 8, wherein the linear motion mechanism housing is made of a material different from a material of the caliper body.

11. The electromechanical brake system according to claim 8, wherein the linear motion mechanism housing has a rotationally symmetrical shape.

12. The electromechanical brake system according to claim 7, wherein the reduction gear mechanism comprises an output gear configured to output the rotation of the electric motor to the linear motion mechanism,
wherein the rotary shaft is arranged coaxially with the output gear such that the rotation of the electric motor is input to the rotary shaft from the output gear, and
wherein the electromechanical brake system further comprises first positioning fitted portions arranged between contact surfaces of the linear motion mechanism housing and the housing-fixing plate that are in contact with each other, and fitted to each other such that a center of the rotary shaft coincides with a center of the output gear.

13. The electromechanical brake system according to claim 12, wherein the linear motion mechanism housing and the reduction gear mechanism housing are arranged such that the housing-fixing plate is sandwiched between the linear motion mechanism housing and the reduction gear mechanism housing, and
wherein the linear motion mechanism housing and the reduction gear mechanism housing are detachably tightened relative to each other by a tightening component, and fixed to the housing-fixing plate.

14. The electromechanical brake system according to claim 12, wherein the linear motion mechanism further comprises a linear motion member configured to move together with the one of the two friction pads; and
a stretchable tubular boot having two ends, with one of the two ends connected to an inner periphery of the linear motion mechanism housing, and the other of the two ends connected to an outer periphery of the linear motion member, so as to prevent foreign matter from entering the linear motion mechanism housing.

15. The electromechanical brake system according to claim 12, further comprising a seal member arranged between the linear motion mechanism housing and the housing-fixing plate so as to prevent foreign matter from entering the linear motion mechanism housing.

16. The electromechanical brake system according to claim 12, wherein the linear motion mechanism housing is made of a material different from a material of the caliper body.

17. The electromechanical brake system according to claim 12, wherein the linear motion mechanism housing has a rotationally symmetrical shape.

18. The electromechanical brake system according to claim 12, wherein the linear motion mechanism is a planetary roller mechanism comprising:
the outer ring member;
planetary rollers configured such that due to the rotation of the electric motor, the planetary rollers revolve around the rotary shaft inside of the outer ring member, while rotating about respective axes of the planetary rollers;
a helical rib on an inner periphery of the outer ring member; and
a helical groove or circumferential grooves arranged in an outer periphery of each of the planetary rollers such that the helical rib is engaged in the helical groove or the circumferential grooves.

19. The electromechanical brake system according to claim 12, further comprising second positioning fitted portions arranged between contact surfaces of the reduction gear mechanism housing and the housing-fixing plate that are in contact with each other, and fitted to each other such that the center of the rotary shaft coincides with the center of the output gear.

20. The electromechanical brake system according to claim 19, wherein the linear motion mechanism housing and the reduction gear mechanism housing are arranged such that the housing-fixing plate is sandwiched between the linear motion mechanism housing and the reduction gear mechanism housing, and wherein the linear motion mechanism housing and the reduction gear mechanism housing are detachably tightened relative to each other by a tightening component, and fixed to the housing-fixing plate.

* * * * *